US012808501B2

(12) United States Patent
Vissenberg et al.

(10) Patent No.: US 12,808,501 B2
(45) Date of Patent: Nov. 24, 2026

(54) LED STRIP COMPRISING CONTINUOUS LINE OF LED FILAMENTS

(71) Applicant: SIGNIFY HOLDING B.V., Eindhoven (NL)

(72) Inventors: Michel Cornelis Josephus Marie Vissenberg, Roermond (NL); Leendert Teunis Rozendaal, Valkenswaard (NL); Marcellinus Petrus Carolus Michael Krijn, Eindhoven (NL); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 35 days.

(21) Appl. No.: 18/271,452

(22) PCT Filed: Jan. 7, 2022

(86) PCT No.: PCT/EP2022/050226
§ 371 (c)(1),
(2) Date: Jul. 8, 2023

(87) PCT Pub. No.: WO2022/152617
PCT Pub. Date: Jul. 21, 2022

(65) Prior Publication Data

US 2024/0052981 A1 Feb. 15, 2024

(30) Foreign Application Priority Data

Jan. 14, 2021 (EP) .................................... 21151603

(51) Int. Cl.
*F21S 4/24* (2016.01)
*F21V 9/30* (2018.01)
(Continued)

(52) U.S. Cl.
CPC .................................... *F21S 4/24* (2016.01); *F21V 9/30* (2018.02); *F21V 21/0808* (2013.01); *F21Y 2115/10* (2016.08)

(58) Field of Classification Search
CPC ........................ F21Y 2105/10; F21Y 2113/13; F21Y 115/10; F21K 9/64; F21V 23/002;
(Continued)

(56) References Cited

U.S. PATENT DOCUMENTS 10,136,485 B1 11/2018 Coetzee et al.
10,631,386 B1 * 4/2020 McRae .................. H05B 45/37
(Continued)

FOREIGN PATENT DOCUMENTS

CN 101194369 A 6/2008
CN 102483201 A 5/2012
(Continued)

*Primary Examiner* — William J Carter

(57) ABSTRACT

The invention provides a LED filament device (1000) comprising an elongated LED filament unit (1100), wherein the elongated LED filament unit (1100) is configured to generate filament unit light (1101); wherein: —the elongated LED filament unit (1100) comprises n1 sets (1150) of LED filaments (400), wherein the n1 sets (1150) of LED filaments (400) are electrically coupled, wherein the n1 sets (1150) of LED filaments (400) are configured in a linear array, wherein n1≥2; wherein each set (1150) of LED filaments (400) comprises at least two electrically antiparallel configured LED filaments (400); —the LED filaments (400) are configured to generate filament light (401); wherein each LED filament (400) comprises n2 solid state-based light generating devices (100), wherein the solid state-based light generating devices (100) are electrically coupled, wherein the solid state-based light generating devices (100) are configured to generate device light (101); wherein n2 for the LED filaments (400) are selected from the range of ≥4; and—one or more of the coupled solid state-based light
(Continued)

generating devices (100) are at least partly encapsulated with an encapsulant (160) comprising a light transmissive material.

16 Claims, 4 Drawing Sheets

(51) Int. Cl.
*F21V 21/08* (2006.01)
*F21Y 115/10* (2016.01)

(58) Field of Classification Search
CPC .... F21V 31/005; F21V 23/023; F21V 23/003; F21V 23/06; F21V 9/30; F21V 21/08; F21S 4/24
See application file for complete search history.

(56) References Cited

U.S. PATENT DOCUMENTS

| | | | | |
|---|---|---|---|---|
| 2007/0273299 | A1 | 11/2007 | Miskin et al. | |
| 2010/0046220 | A1* | 2/2010 | Fukasawa | F21K 9/00 362/249.02 |
| 2016/0363267 | A1 | 12/2016 | Jiang et al. | |
| 2017/0023204 | A1* | 1/2017 | Takeuchi | F21V 29/70 |

FOREIGN PATENT DOCUMENTS

| | | | |
|---|---|---|---|
| CN | 103956421 | A | 7/2014 |
| DE | 202014003466 | U1 | 7/2014 |
| DE | 202016104159 | U1 | 9/2016 |
| DE | 102015120085 | A1 | 5/2017 |
| WO | 2012011277 | A1 | 1/2012 |
| WO | 2018172700 | A1 | 9/2018 |
| WO | 2020083647 | A1 | 4/2020 |
| WO | 2020254130 | A1 | 12/2020 |

* cited by examiner

LED STRIP COMPRISING CONTINUOUS LINE OF LED FILAMENTS

CROSS-REFERENCE TO PRIOR APPLICATIONS

This application is the U.S. National Phase application under 35 U.S.C. § 371 of International Application No. PCT/EP2022/050226, filed on Jan. 7, 2022, which claims the benefit of European Patent Application No. 21151603.4, filed on Jan. 14, 2021. These applications are hereby incorporated by reference herein.

FIELD OF THE INVENTION

The invention relates to a LED filament device as well as to a light generating device comprising such LED filament device.

BACKGROUND OF THE INVENTION

LED strips are known in the art. US2017030536, for instance, describes a flexible LED strip, comprising modules that include light-emitting diodes arranged successively at intervals, wherein the light-emitting diodes of each module are electrically interconnected on one circuit board each together with other electronic components, the LED strip can be severed between the modules without destroying the electrical functionality of the modules, each module has at least one contact region at which a power supply can be connected to the module and all circuit-board sections are mounted in a flexible enclosure, and the at least one contact region of each module extends through the enclosure and can be electrically contacted outside the enclosure.

US2017/023204A1 discloses a light bulb having an elongated base board with a first end and a second end at opposed ends of a longitudinal axis of the base board, and an upper surface. Multiple lines of light-emitting diodes are arranged parallel to the longitudinal axis of the base board and between the first end and the second end. A base is provided for receiving power. A translucent seal that includes a wavelength conversion material is provided, in which the seal covers the light-emitting diodes and covers the upper surface of the base board. A first power supply lead and a second power supply lead are provided for supplying power to the light-emitting diodes. A housing that houses the base board, the light-emitting diodes, and the power-supply leads, is provided in which the housing is attached to the base.

DE102015120085A1 discloses a retrofit lamp with a LED filament having a carrier element with a first serial LED string on a first side of the carrier element and a second serial LED string on the second side of the carrier element.

SUMMARY OF THE INVENTION

LED strips may be applied for e.g. cove lighting, shelf lighting, decorative lighting integrated into furniture/kitchens/boats/swimming pools/, safety lighting to accentuate steps or railing (could double as decorative lighting), etcetera. These LED strips may be used for indirect lighting effects, i.e. the LED sources themselves are not directly visible. When the LEDs can be visible, either directly or via reflections, the LEDs may be covered by a diffusive layer to blend the individual LEDs into a continuous linear light source, since it may be desirable to give the impression of a continuous light source, not a series of individual light points. The drawback of such a diffuser may be increased build-in depth and reduced efficiency.

Hence, it is an aspect of the invention to provide an alternative LED filament device, which preferably further at least partly obviates one or more of above-described drawbacks. The present invention may have as object to overcome or ameliorate at least one of the disadvantages of the prior art, or to provide a useful alternative.

In a first aspect, the invention provides a LED filament device comprising an (elongated) LED filament unit, wherein the (elongated) LED filament unit is configured to generate (in operation) filament unit light. Especially, the (elongated) LED filament unit may comprise n1 sets of LED filaments. In embodiments, the n1 sets of LED filaments may be electrically coupled. Further, in embodiments the n1 sets of LED filaments may be configured in a linear array. Especially, in embodiments n1≥2. Further, especially each set of LED filaments may comprise (at least) two electrically antiparallel configured LED filaments. Especially, in embodiments the LED filaments are configured to generate filament light (during operation). Further, in specific embodiments each LED filament may comprise n2 solid state-based light generating devices. Especially, in embodiments the solid state-based light generating devices are electrically coupled. In embodiments, the solid state-based light generating devices are configured to generate (during operation) device light. Especially, in embodiments n2 for the (respective) LED filaments may be selected from the range of ≥2, especially from the range of ≥4. Further, in embodiments one or more of the coupled solid state-based light generating devices may at least partly be encapsulated with an encapsulant comprising a light transmissive material. Therefore, especially in embodiments the invention provides a LED filament device comprising an elongated LED filament unit, wherein the elongated LED filament unit is configured to generate filament unit light; wherein: (a) the elongated LED filament unit comprises n1 sets of LED filaments, wherein the n1 sets of LED filaments are electrically coupled, wherein the n1 sets of LED filaments are configured in a linear array, wherein n1≥2; wherein each set of LED filaments comprises (at least) two electrically antiparallel configured LED filaments; (b) the LED filaments are configured to generate filament light; wherein each LED filament comprises n2 solid state-based light generating devices, wherein the solid state-based light generating devices are electrically coupled, wherein the solid state-based light generating devices are configured to generate device light; wherein n2 for the LED filaments are selected from the range of ≥4; and (c) one or more of the coupled solid state-based light generating devices are at least partly encapsulated with an encapsulant comprising a light transmissive material.

With such LED filament device, it may be possible to provide an elongated lighting device which may provide an essentially continuous line of light. Further, with such LED filament device it may be possible to provide a flexible (and/or bendable) LED filament unit, which may e.g. be provided as roll. Further, with such LED filament device it may be possible to provide a LED filament device that may be configured in corners and which may fit in specific corners and/or which may easily adhere to wall elements defining corners.

The elongated filament may be compact, which enables integration in compact coves or niches, and embedding in interior or furniture objects. Further, in embodiments the omnidirectional, continuous illumination may also enable the elongated filament to be hanging (attached at top, optionally some weight at bottom) or span between two attachment points across a room. Yet, in embodiments the continuous line illumination can further enable a compact solution for decorative or signage applications (compact "neon-light"). For this purpose, the (flexible and/or bendable) filament may in embodiments be attached to a linear support shape, or alternatively, in embodiments the flexibility of the filament may be restricted by adding a bendable linear carrier to the structure (possibly doubling as electrode (s)). Another application could be in embodiments to provide orientation light (e.g. underneath a bed or around a door frame, e.g. in a hospital to facilitate orientation at night). Such an orientation light may be both in direct view, or provide indirect light with the filament embedded in a door or furniture frame.

The LED filament device comprises an elongated LED filament unit. The term "LED filament unit" may refer to one or more LED filament units. When a plurality of LED filament unit are comprised by the LED filament device, two or more LED filament units may be the same or two or more LED filament units may be different. When they are the same, the spectral power distribution(s) of the light (filament unit light; see also below) may essentially be the same. Further, the LED filament units may comprise essentially identical LED filaments as well as essentially the same configuration of the LED filaments. Optionally, the LED filament device may comprise other types of light sources, different from the elongated LED filament unit(s). The LED filament device is configured to provide LED filament device light during operation of the LED filament device. In operational modes, this LED filament device light may comprise the filament unit light of one or more of the one or more LED filament units. In specific embodiments, this LED filament device light may essentially consist of the filament unit light of one or more of the one or more LED filament units. The term "LED filament device light" refers to light escaping from the LED filament device. Instead of the term "LED filament device", also the term "LED filament based device" may be applied. Here below, the invention is especially described in relation to a single LED filament.

The LED filament device may further comprise a control system. The control system may be configured to control the spectral power distribution of the filament unit light (and/or of the LED filament device light). See further also below.

As indicated above, the elongated LED filament unit is configured to generate filament unit light during operation of the LED filament unit. The term "filament unit light" refers to light escaping from the filament unit.

Especially, the LED filament device comprises a plurality of LED filaments. Especially, the LED filaments are comprised by the LED filament unit. In specific embodiments, the elongated LED filament unit comprises n1 sets of LED filaments.

Basically, in embodiments a LED filament may comprise an array of solid state-based light generating devices, configured at distances from each other, and provided as single unit. In embodiments, the distance may be relatively small.

In specific embodiments, the solid state-based light generating devices may be available on a support. The support may in embodiments be flexible. In embodiments, the support may be a flexible PCB. The support may in embodiments be bendable. In embodiments, the support may be bendable PCB. In embodiments, the support may be plastically or elastically deformable. In embodiments the support may be light transmissive. The support may in embodiments comprise one or more of (metal) leads and resin (material). In specific embodiments, the support may comprise a flexible and/or bendable PCB. In specific embodiments, the support may comprise a polymeric support, e.g. a polyimide support. In specific embodiments, the support may comprise a light transmissive polymeric support. In embodiments, the support may comprise a foil. This support may be indicated as "LED filament support" or "light generating device support". Hence, in embodiments the LED filament may comprise a LED filament support or light generating device support configured to support one or more of the (i) solid state-based light generating devices and (ii) electrical conductors.

In specific embodiments (especially of the LED filament), the solid state-based light generating are at least partly embedded in an encapsulant. Especially, the encapsulant may comprise a light transmissive material. In embodiments, the encapsulant may comprise a resin. The resin may in specific embodiments comprise scattering particles and/or a luminescent material. Especially, in embodiments the encapsulant may fully encloses the solid state-based light generating devices and/or the support and the encapsulant may fully enclose the solid state-based light generating devices.

In embodiments, the LED filament may comprise a 1D array or a 2D array of solid state-based light generating devices. Hence, in embodiments the LED filament may comprise 1-4 rows, such as 1-3 rows, like one or two rows of solid state-based light generating devices. Each of the one or more rows may comprise a plurality of solid state-based light generating devices. This number is herein indicated as n2. Especially, n2 is at least 2, but will in general be larger, like at least 4, such as at least 8, like in embodiments at least 16. In specific embodiments, n2 may be selected from the range of 4-4000, such as 8-400, though larger number may also be possible. Especially, $n2 \geq 8$. Further, in specific embodiments, $8 \leq n2 \leq 100$, such as especially $16 \leq n2 \leq 80$. Especially, in embodiments $16 \leq n2 \leq 40$, like in embodiments $24 \leq n2 \leq 32$.

As can be derived from the above, the 1D array or 2D array of solid state-based light generating devices may (at least partly) be encapsulated by an encapsulant.

The mutual distance between solid state-based light generating devices within a row may be relatively small. They may in embodiments even touch. Hence, in embodiments adjacent solid state-based light generating devices (comprised by the same LED filament) may have shortest distances (d1) selected from the range of 0-4 mm, such as 0-3 mm. Especially, in embodiments adjacent solid state-based light generating devices (comprised by the same LED filament) may have shortest distances (d1) selected from the range of 0-2 mm, such as in specific embodiments 0-1 mm. The LED filament may have a filament length and an equivalent circular diameter. The equivalent circular diameter may be defined perpendicular to the filament length. The equivalent circular diameter may be used instead of a width and a height, though optionally in specific embodiments also the width and height may be used instead of the equivalent circular diameter.

The equivalent circular diameter (or ECD) (or "circular equivalent diameter") of an (irregularly shaped) two-dimensional shape is the diameter of a circle of equivalent area. For instance, the equivalent circular diameter of a square with side a is $2*a*SQRT(1/\pi)$. For a circle, the diameter is the same as the equivalent circular diameter. Would a circle in an xy-plane with a diameter D be distorted to any other shape (in the xy-plane), without changing the area size, than the equivalent circular diameter of that shape would be D.

The length may be larger than the width or height. Especially, the LED filament may have an aspect ratio of the length and the equivalent circular diameter of at least 2, like at least 5, such as at least 10. In general, the filaments may have aspect ratios of length and width, and of length and height, or length and equivalent circular diameter, of at least 10, such as selected from the range of 10-10,000. The aspect ratios of different filaments may in specific embodiments differ, though in embodiments the aspect ratios may essentially be the same. Note that for a filament the aspect ratio of the length and width and the aspect ratio of the length and height may differ.

Therefore, the LED filaments may be elongated. Especially, the elongated LED filament unit comprises a plurality of (such elongated) LED filaments. Hence, the LED filament unit may thus also be elongated. Especially, in embodiments the n1 sets of LED filaments may be configured in a linear array, especially a 1D array. This may (especially lead to a LED filament unit that is elongated.

In embodiments, the linear array of LED filaments may be a 1D or 2D array, of k*p LEDs, wherein k may in embodiments be selected from the range of 1-4, such as 1-3, like 1-2, such as in embodiments 1 or in embodiments 2, and p may be selected from the range of larger than k, such as especially selected from the range of at least 4 (when k<4), like at least 6, such as at least 8. Especially, k may be 1 or 2, such as 1, and p may be at least 4, like at least 8. In specific embodiments p=2*n1. Hence, in specific embodiments all sets may be configured in a linear 1D array. Therefore, in such ways the LED filament unit may thus be elongated. Hence, the LED filament unit is herein also indicated as elongated LED filament unit.

With respect to the LED filaments, in embodiments the LED filament may have a length of at least about 5 mm, such as at least 10 mm. Yet further, in embodiments the LED filament may have a length of at maximum about 200 mm, such as at maximum 150 mm, such as at maximum about 100 mm. Especially, the length may be selected from the range of 5-100 mm. The LED filament may have a length axis having a first length (L1). Especially, the solid state-based light generating devices are arranged over the first length (L1) of the LED filament on the support.

The width, height, diameter, or equivalent circular diameter may be selected from the range of at least about 0.3 mm, such as at least about 0.5 mm. Further, width, height, diameter, or equivalent circular diameter may be selected from the range of at maximum about 10 mm, such as at maximum about 5 mm. Especially, width, height, diameter, or equivalent circular diameter may be selected from the range of 0.5-3 mm.

The LED filament may have two electrical contacts, which may in embodiments be configured at opposite ends of the LED filament. Especially, the distance between the two electrical contacts may be at least 80% of the length of the LED filament, such as at least 90% of the length of the LED filament.

The LED filament may be flexible and/or bendable. In other embodiments, whether or not the LED filament may be flexible and/or bendable, the LED filaments may have lengths up to about 100 mm, such as up to about 50 mm, like in embodiments up to about 20 mm. This may facilitate providing the LED filament unit as a roll or configuring the LED filament unit in a curved or angled configuration. In specific embodiments, the LED filament may be plastically or elastically deformable. In specific embodiments, the LED filament may be bent around a corner or in a decorative shape like an iron wire can be bent.

As indicated above, the LED filament device may be configured to provide LED filament device light. Further, the LED filament unit may be configured to generate LED filament unit light. Hence, the LED filament device light may comprise the light of one or more LED filament units.

The LED filament unit comprises a plurality of LED filaments. The LED filaments are configured to generate filament light in one or more operational modes. Hence, the LED filament unit light may comprise the light of one or more LED filaments.

The LED filament unit may comprise main electrical contacts, which may especially be configure at one end of the elongated LED filament unit.

The LED filament light may comprise one or more of light source light and luminescent material light. As indicated above, the LED filament device light may in an operational mode comprise LED filament light of one or more LED filament units. Hence, the LED filament device light may in specific embodiments comprise one or more of light source light of the solid state-based light generating devices (device light) and luminescent material light of a LED filament unit.

The LED filament may comprise an encapsulant (also herein indicated as first encapsulant; see also below) and/or the LED filament may be encapsulated by an encapsulant (herein also indicated as second encapsulant; see also below). Hence, (effectively one or more of the coupled solid state-based light generating devices may at least partly encapsulated with an encapsulant comprising a light transmissive material. As indicated above, the light transmissive material may in specific embodiments comprise scattering particles and/or a luminescent material. Would the encapsulant comprise a luminescent material, the LED filament unit light may comprise one or more device light and luminescent material light. Note that the solid state-based light generating devices may in specific embodiments comprise PC LEDs (phosphor converted LEDs), which would especially imply that the device light may (already) comprise luminescent material light; see further also below.

As indicated above, each LED filament may comprise n2 solid state-based light generating devices. The solid state-based light generating devices may comprise one or more of LEDs, laser diodes, and superluminescent diodes. Note that in specific embodiments, the solid state-based light generating devices may comprise PC LEDs or non-PC LEDs. The number n2 for the LED filaments may be selected from the range of ≥4 (i.e. n2≥4), such as 16≤n2≤100, such as 16≤n2≤80 (see also above). Two or more LED filaments may have the same number n2 of solid state-based light generating devices or may have different number of solid state-based light generating devices. Hence, the phrase "n2 for the LED filaments" may indicated that n2 may be selected for each LED filament individually. In specific embodiments, all LED filaments have the same n2 value.

Especially, the solid state-based light generating devices (of a LED filament) may be electrically coupled. Hence, the LED filament may comprise at its ends two electrical contacts which can be used to provide electrical power to the solid state light sources. The solid state light sources may be configured in parallel or in series, or in parallel sets each comprising a series of solid state-based light generating devices. Further, as indicated above, the solid state-based light generating devices are configured to generate device light.

Especially, the n1 sets of LED filaments are electrically coupled. This may provide an elongated LED filament unit, especially as in further embodiments the n1 sets of LED filaments may be configured in a linear array. As indicated above, especially n1≥2, such as n1≥4. Even more especially, 2≤n1≤10,000, such as 4≤n1≤1,000, though higher numbers may also be possible.

Intermediate space between adjacent LED filaments can further be optimized by configuring LED filaments antiparallel. Hence, in embodiments at least two LED filaments may be configured electrically antiparallel. Especially, in electronics, two antiparallel (or inverse-parallel) devices are connected in parallel but with their polarities reversed. By using antiparallel electrical coupling, the number of contacts may be reduced. Hence, especially each set of LED filaments may comprise (at least) two electrically antiparallel configured LED filaments.

Therefore, in specific embodiments adjacent solid state-based light generating devices on adjacent LED filaments of a set of LED filaments have shortest distances (d2) selected from the range of 0-8 mm, such as 0-4 mm, such as especially 0-2 mm, like in specific embodiments 0-1 mm. In yet further specific embodiments, d2 may be selected from the range of 0-4 mm, such as 0-2 mm, like not more than 1 mm. Hence, all solid state-based light generating devices may in embodiments have mutual distances selected from the range of 0-6 mm, such as 0-4 mm, like in more specific embodiments selected from the range of 0-2 mm, like selected from the range of 0-1 mm.

In specific embodiments, the LED filaments of a set of LED filaments may have first length axes (A1). Further, the set of LED filaments may have a second length axis (A2). In embodiments, the first length axes may be parallel and have a mutual axis angle $\alpha_A$ with the second length axis (A2). In embodiments, the mutual axis angle $\alpha_A$ may be 0°. Hence, in embodiments the first length axes may be parallel and colinear. In yet other embodiments, the first length axes may also be parallel, but not colinear. In such embodiments, the mutual axis angle $\alpha_A$ may larger than 0° though in general not larger than 30°. For instance, in embodiments angle $\alpha_A$ may be selected from the range of 0-30°, like 2-30°, such as 5-30°.

As indicated above, the LED filament unit may comprise a plurality of LED filaments. Hence, the LED filament unit may comprise a plurality of sets of LED filaments, wherein in one or more, especially all sets, the LED filaments are configured electrically antiparallel. More especially, all LED filaments may be configured electrically antiparallel. Hence, also the sets may be configured electrically antiparallel. Therefore, two or more of the n1 sets of LED filaments are configured electrically antiparallel. Especially, all sets of the LED filament unit may be configured electrically antiparallel. Therefore, in specific embodiments (essentially) all LED filaments may be configured electrically antiparallel.

By applying the electrically antiparallel configuration, LED filaments may be configured relatively close to each other, and may in embodiments even touch. Therefore, in specific embodiments the linear array of LED filaments may comprise sets of adjacent LED filaments, wherein two or more sets of adjacent LED filaments comprise LED filaments that are configured in physical contact with each other.

The antiparallel configuration may especially be chosen to allow neighboring filaments to share the same electrical contact. Hence, in embodiments the electrode ends of the filaments may either be in physical contact or may be in contact with the same electrode.

Each LED filament may comprise electrical contacts at (opposite) ends of the LED filament. For instance, in specific embodiments electrical contacts of adjacent LED filaments may touch. One (or both) of these, may in embodiments be physically coupled with an electrical conductor (see also below).

As indicated above, the plurality of LED filaments may be configured as elongated LED filament unit. Each LED filament unit may have to be powered with electrical energy. Hence, along the elongated array of LED filaments, elongated electrically conductive tracks may be configured, which may electrically be connected with the LED filaments of sets of LED filaments. Such connections may be provided via a (short) branch, branching off from the elongated electrically conductive track. Hence, in embodiments the LED filament device may comprise a first elongated electrically conductive track and a second elongated electrically conductive track, wherein each LED filament is electrically coupled to the first elongated electrically conductive track and the second elongated electrically conductive track. Especially, the length of the electrically conductive tracks may be at least 80% of the length of the LED filament, such as at least 90% of the length of the LED filament.

There may be several ways to provide the elongated LED filament unit. For instance, in embodiments one may provide a backbone of electrical conductors and solid state-based light generating devices, and at least partially enclose these with an encapsulant. In other embodiments, one may provide a backbone of LED filaments and electrical conductors, and at least partially enclose these with an encapsulant. In yet other embodiments, one may provide the LED filaments on a support, and optionally at least partially enclose these with an encapsulant. The support may also be used to support the electrical conductors, such as electrically conductive tracks.

In specific embodiments, the LED filament device may comprise a filament support configured to support the LED filaments. The filament support may in embodiments comprise one or more of (metal) leads and resin (material). In specific embodiments, the filament support may comprise a flexible (and/or bendable) PCB. In specific embodiments, the filament support may comprise a polymeric support, e.g. a polyimide support. In specific embodiments, the filament support may comprise a light transmissive polymeric support. The filament support may embodiments be flexible (and/or bendable). In embodiments, the support may comprise a foil. Hence, this support may be indicated as filament support. Hence, in embodiments the LED filament unit may comprise a filament support configured to support one or more of the (i) LED filaments and (ii) electrical conductors.

Therefore, in specific embodiments the first elongated electrically conductive track and the second elongated electrically conductive track may be comprised by the filament support.

As indicated above, in embodiments, one or more of the LED filaments may comprise a light generating device support configured to support the solid state-based light generating devices. In yet further specific embodiments, one or more of the LED filaments comprise a first encapsulant, wherein the first encapsulant encloses at least part of one or more of the solid state-based light generating devices. Hence, in such embodiments the LED filament unit comprises the encapsulant, wherein the encapsulant comprises the first encapsulant. Hence, the term "light generating device support" may indicate a support for one or more light generating devices.

As indicated above, the (first) encapsulant may comprise one or more of scattering particles and luminescent material. Hence, in specific embodiments, the first encapsulant may comprises a first encapsulant material, wherein the first encapsulant material comprises a first resin and a first luminescent material embedded in the first resin, wherein the first luminescent material is configured to convert at least part of the device light into first luminescent material light. Hence, in specific embodiments the light transmissive material (see also above) may comprise the first encapsulant material.

As indicated above, the LED filament may comprise a (first) encapsulant and/or the LED filament may be encapsulated with a (second) encapsulant. In specific embodiments, at least the latter may be available. Therefore, in specific embodiments the elongated LED filament unit may comprise a second encapsulant, wherein the second encapsulant encloses at least part of one or more of the LED filaments. Hence, in such embodiments the encapsulant comprises the second encapsulant.

As indicated above, the (second) encapsulant may comprise one or more of scattering particles and luminescent material. Therefore, in specific embodiments the second encapsulant comprises a second encapsulant material, wherein the second encapsulant material comprises a second resin and a second luminescent material embedded in the second resin, wherein the second luminescent material is configured to convert at least part of the filament light into second luminescent material light. Hence, in such embodiments the light transmissive material comprises the second encapsulant material.

When both encapsulants are available, (i) in first embodiments one may comprise a luminescent material and optionally scattering particles, and another may not comprise a luminescent material, and may not comprise scattering particles, (ii) in second embodiments one may comprise a luminescent material and optionally scattering particles, and another may not comprise a luminescent material, but may comprise scattering particles, and (iii) in second embodiments one may comprise a luminescent material and optionally scattering particles, and another may comprise a luminescent material, and may comprise scattering particles, though in specific embodiments, the luminescent materials of the different encapsulant may also be different. However, further embodiments may also be possible. Further, when both encapsulants are available, the second encapsulant may at least partly enclose the first encapsulant. For instance, the second encapsulant may circumferentially enclose the first encapsulant.

Hence, when there are two encapsulants both the first luminescent material and the second luminescent material may be available, only one of the first luminescent material and the second luminescent material may be available, or none of the first luminescent material and the second luminescent material may be available. Further, when there are two encapsulant, each encapsulant may comprise scattering particles, one of them may comprise scattering particles, and none of them may comprise scattering particles. Further, as indicated above, in embodiments only the first encapsulant may be available and in other embodiments only the second encapsulant may be available, and in yet further embodiments, as also indicated above, both the first and the second encapsulant may be available.

In embodiments, the first encapsulant may be flexible and/or bendable. In yet other embodiments, the second encapsulant may be flexible and/or bendable. In yet further embodiments, wherein both the first encapsulant and the second encapsulant are available, both may be flexible and/or bendable.

Especially, a LED filament may be configured to provide LED filament light. The term "LED filament light" may refer to the light of the LED filament during operation of the LED filament. The LED filament may in embodiments comprises a plurality of light emitting diodes (LEDs), especially arranged in a linear array.

The linear array may be a 1D or 2D array, of n*m LEDs, wherein n may in embodiments be selected from the range of 1-4, such as 1-3, like 1-2, such as in embodiments 1 or in embodiments 2, and m may be selected from the range of larger than n, such as especially selected from the range of at least 4 (when $n<4$), like at least 6, such as at least 8.

Further, the LEDs may be arranged for emitting LED light e.g. of different colors or spectral power distributions. In embodiments, two or more LEDs may be configured to provide light having essentially the same spectral power distributions. Even more especially, in embodiments all LEDs may be configured to provide light having essentially the same spectral power distributions. In yet other embodiments, two or more LEDs may be configured to provide light having different spectral power distributions.

In embodiments, the LED filament may have a length L and a width W, with in specific embodiments $L \geq 5$ W. The LED filament may be arranged in a straight configuration or in a non-straight configuration, such as for example a curved configuration, a (2D or 3D) spiral, or a helix.

In specific embodiments, the LEDs may be arranged on an (elongated) carrier like for instance a substrate. In embodiments, the (elongated) carrier may be rigid (made from e.g. a polymer, glass, quartz, metal or sapphire) or flexible (e.g. made of a polymer or metal e.g. a film or foil). As indicated above, in embodiments the carrier, such as e.g. a substrate, may in embodiments flexible and/or bendable.

In case the carrier comprises a first major surface and an opposite second major surface, the LEDs are arranged on at least one of these surfaces. In embodiments, the carrier may be light reflective, especially reflective for the filament light. In embodiments, the carrier may be light transmissive, such as translucent and in specific embodiments transparent.

In embodiments, the LED filament may comprise an encapsulant at least partly covering at least part of the total number of LEDs (of the plurality of LEDs). In specific embodiments, the encapsulant may also at least partly cover at least one of the first major or second major surface.

The encapsulant may comprise a polymer material which may in embodiments be flexible such as for example a silicone. In embodiments, the encapsulant may comprise a resin. In embodiments, the encapsulant may comprise one or more of a luminescent material and a light scattering material. The one or more of the luminescent material and the light scattering material may be embedded in the encapsulant material, such as the polymer material. The luminescent material may especially be configured to at least partly convert LED light into converted light. The luminescent material may also be indicated as "phosphor". The luminescent material may comprise a phosphor such as an inorganic phosphor and/or quantum dots or rods.

Hence, the LED filament light may comprise in specific embodiments one or more of LED light and converted light ("luminescent material light"). Hence, instead of the term "luminescent material light", also the term "converted light" may be applied.

In embodiments, the LED filament may comprise multiple sub-filaments.

As indicated above, the LED filament may in embodiments comprises a plurality of light emitting diodes. However, the term LED in the context of LED filament, may also refer to solid state light sources (in general). Hence, the LED filament may comprise one or more of LEDs, laser diodes, and superluminescent diodes. Especially, the LED filament comprises a plurality of light emitting diodes (LEDs).

In specific embodiments, a LED filament may comprise multiple series-connected (blue and/or other/red) LEDs on a transparent substrate (e.g. chip-on-glass), covered in a (diffusing and/or color converting) encapsulant in order to provide a linear, omnidirectional light source.

When a luminescent material is applied, especially one or more of the solid state-based light generating devices may comprise solid state light sources configured to generate one or more of UV radiation and blue radiation, though optionally other types of radiation may also be possible.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to visible light. The term UV radiation may in specific embodiments refer to near UV radiation (NUV). Therefore, herein also the term "(N)UV" is applied, to refer to in general UV, and in specific embodiments to NUV. The term IR radiation may in specific embodiments refer to near IR radiation (NIR). Therefore, herein also the term "(N)IR" is applied, to refer to in general IR, and in specific embodiments to NIR. The terms "visible", "visible light" or "visible emission" and similar terms refer to light having one or more wavelengths in the range of about 380-780 nm. Herein, UV (ultraviolet) may especially refer to a wavelength selected from the range of 190-380 nm, though in specific embodiments other wavelengths may also be possible. Herein, IR (infrared) may especially refer to radiation having a wavelength selected from the range of 780-3000 nm, such as 780-2000 nm, e.g. a wavelength up to about 1500 nm, like a wavelength of at least 900 nm, though in specific embodiments other wavelengths may also be possible. Hence, the term IR may herein refer to one or more of near infrared (NIR (or IR-A)) and short-wavelength infrared (SWIR (or IR-B)), especially NIR. The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion. In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}\geq\lambda_{em}$). In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence. The term "luminescent material" may also refer to a plurality of different luminescent materials. Examples of possible luminescent materials are indicated below. In embodiments, luminescent materials are selected from garnets and nitrides, especially doped with trivalent cerium or divalent europium, respectively. The term "nitride" may also refer to oxynitride or nitridosilicate, etc.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce.

This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein $x1+x2+x3=1$, wherein $x3>0$, wherein $0<x2+x3\leq 0.2$, wherein $y1+y2=1$, wherein $0\leq y2\leq 0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially $x1>0$, such as $\geq 0.2$, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the first light source light and the second light source light (and the optical filter)). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein $0<x2+x3\leq 0.1$, and wherein $0<y2\leq 0.1$. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein $x1+x3=1$, and wherein $0<x3\leq 0.2$, such as 0.001-0.1. In specific embodiments, the light generating device may only include luminescent materials selected from the type of cerium comprising garnets. In even further specific embodiments, the light generating device includes a single type of luminescent materials, such as $(Y_{x1-x2-x3}A'_{x2}Ce_{x3})_3(Al_{y1-y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga In and Sc, wherein $x1+x2+x3=1$, wherein $x3>0$, wherein $0<x2+x3\leq 0.2$, wherein $y1+y2=1$, wherein $0\leq y2\leq 0.2$. Especially, x3 is selected from the range of 0.001-0.1. Note that in embodiments $x2=0$. Alternatively or additionally, in embodiments $y2=0$.

In specific embodiments, A may especially comprise at least Y, and B may especially comprise at least Al.

In embodiments, the luminescent material may alternatively or additionally comprise one or more of $M_2Si_5N_8$:$Eu^{2+}$ and/or $MAlSiN_3$:$Eu^{2+}$ and/or $Ca_2AlSi_3O_2N_5$:$Eu^{2+}$, etc., wherein M comprises one or more of Ba, Sr and Ca, especially in embodiments at least Sr. Hence, in embodiments, the luminescent may comprise one or more materials selected from the group consisting of (Ba,Sr,Ca)S:Eu, $(Ba,Sr,Ca)AlSiN_3$:Eu and $(Ba,Sr,Ca)_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material $(Ba,Sr,Ca)_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca). Likewise, the material $(Ba,Sr,Ca)AlSiN_3$:Eu can also be indicated as $MAlSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, $(Ba,Sr,Ca)AlSiN_3$:Eu and $(Ba,Sr,Ca)_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material $(Ba,Sr,Ca)_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca).

Likewise, the material $(Ba,Sr,Ca)AlSiN_3$:Eu can also be indicated as $MAlSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO ($Y_2SiO_5$:$Ce^{3+}$), or similar compounds, or BAM ($BaMgAl_{10}O_{17}$:$Eu^{2+}$), or similar compounds.

The term "luminescent material" herein especially relates to inorganic luminescent materials. Instead of the term "luminescent material" also the term "phosphor". These terms are known to the person skilled in the art.

Alternatively or additionally, also other luminescent materials may be applied. For instance, quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore, the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

Above indicated luminescent material may be applied as first luminescent material and/or second luminescent material.

The elongated LED filament may be flexible and/or bendable.

The elongated LED filament unit may e.g. be used in coves, drawers, in the corner of a wall and a floor or in the corner of a wall and a ceiling, etc. Hence, it may be useful to provide the LED filament unit with adhesive material, optionally protected with a detachable adhesive material protector (for prevention of adhesion together). The detachable adhesive material protector may in the art also be indicated with the term "removable carrier".

Hence, in embodiments the elongated LED filament unit may (in a stretched configuration) comprise a first elongated unit side and a second elongated unit side, wherein during operation at least part of the filament unit light propagates away from the first elongated unit side, wherein the LED filament device further comprises adhesive material associated to the second elongated unit side. In this way, the LED filament unit may stick to e.g. a wall, a ceiling, a floor, a drawer, a cove, a window, a window frame, etc. It may also be possible to attach the LED filament unit to two planes, which are configured under a mutual angle. Hence, in embodiments the LED filament unit may in embodiments further comprise a third elongated unit side, wherein adhesive material is associated to the third elongated unit side, wherein the second elongated unit side and the third elongated unit side have a first mutual angle (al), wherein the first mutual angle (al) may in specific embodiments be selected from the range of 30-150°. For instance, in embodiments the first mutual angle (al) may be 90°.

In embodiments, the LED filament device may be configured to provide in an operational mode white device light. In specific embodiments, the LED filament device may be configured to provide device light having a controllable spectral power distribution. In this way, one or more of the color point and correlated color temperature of the device light of the LED filament device may be controlled.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

For controlling the device light, a control system may be applied. Hence, the LED filament device may comprise a control system. The LED filament unit may be functionally coupled to the control system (or may in specific embodiments comprise this control system).

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation" or "operational mode". Likewise, in a method an action or stage, or step may be executed in a "mode" or "operation mode" or "mode of operation" or "operational mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme. In specific embodiments, the control system may be configured to control one or more optical properties of the filament unit light. The optical properties may in specific embodiments be selected from the group of intensity, color point, a correlated color temperature.

In yet a further aspect, the invention also provides a lamp or a luminaire comprising the LED filament device as defined herein. The luminaire may further comprise a housing, optical elements, louvres, etc. etc. . . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, a disinfection device, and an optical wireless communication device, comprising the light generating system as defined herein.

In embodiments, the light generating device may be a signage device. In yet embodiments, the light generating device may be a light-emitting decoration device. In yet embodiments, the light generating device may be an ambiance-creation device. In yet embodiments, the light generating device may be an orientation light device.

The light generating device may comprise a housing or a carrier, configured to house or support, respectively one or more of the first light generating device, the second light generating device, and the waveguide.

The LED filament device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The LED filament device may be part of or may be applied in e.g. optical communication systems or disinfection systems.

As indicated above, the LED filament device may generate during operation light. This light may also be indicated as "LED filament device light", i.e. light that is generated by the LED filament device (during operation of the LED filament device). In embodiments, LED filament device light may essentially consist of the filament unit light. Hence, in embodiments, the LED filament device may comprise the elongated LED filament unit(s) as essentially the only source(s) of light. Therefore, in embodiments the LED filament device may be configured to generate filament unit light.

In embodiments, the filament unit light may comprise one or more of filament light and converted filament light. Hence, in embodiments the filament unit light may consist of filament light, in embodiments the filament unit light may comprise (second) luminescent material light based on conversion of the filament light, and in embodiments the filament unit light may comprise filament light and (second) luminescent material light based on conversion of the filament light. Of course, the filament light may be light of two or more filaments. The term "filament light" refers to light that is generated by a LED filament during operation of the LED filament.

Each LED filament may comprise one or more, especially a plurality of, solid state-based light generating devices. Especially, the solid state-based light generating devices are configured to generate device light. Hence, the term "device light" may especially refer to light generated by the solid state-based light generating device(s) during operation of the solid state-based light generating device(s). Of course, the device light may be light of two or more solid state-based light generating devices.

In embodiments, the filament light may comprise one or more of device light and converted device light. Hence, in embodiments the filament light may consist of device light, in embodiments the filament light may comprise (first) luminescent material light based on conversion of the device light, and in embodiments the filament light may comprise device light (first) luminescent material light based on conversion of the device light.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
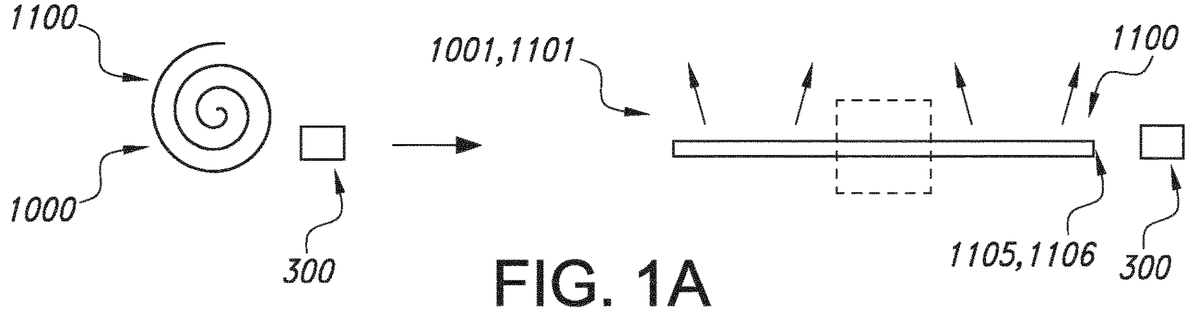
FIGS. 1A-1C schematically depict some embodiments.
Figure 1B:
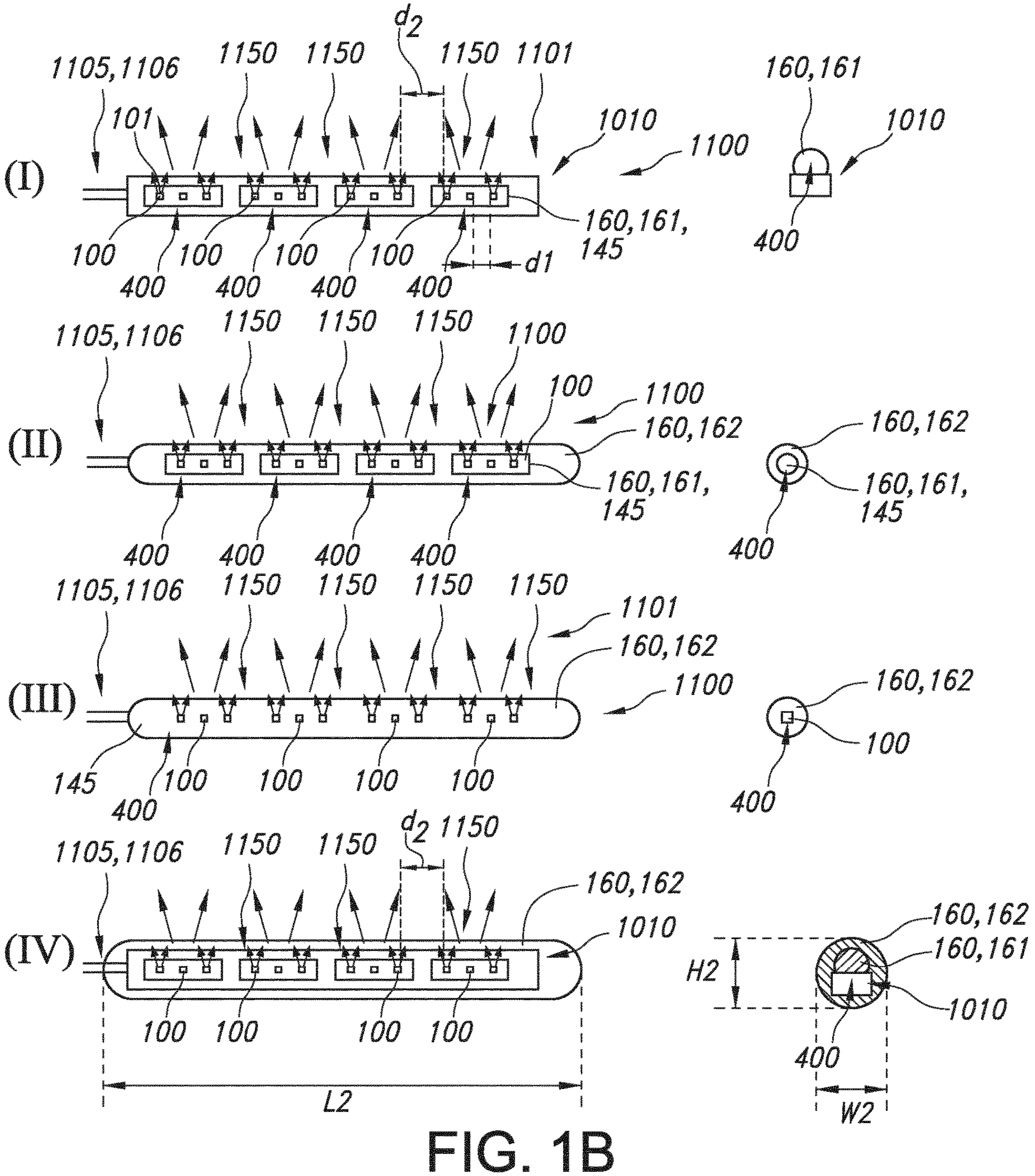
Figure 1C:
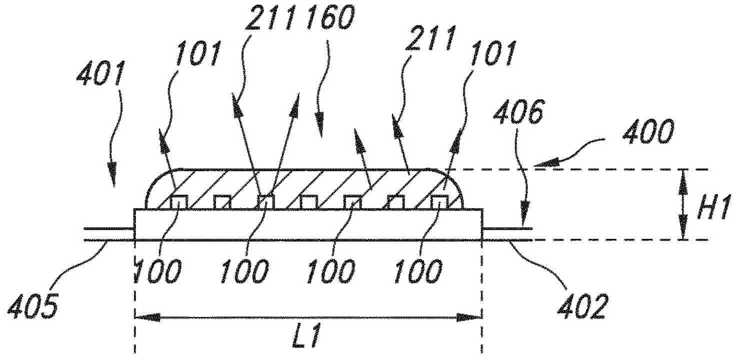

FIGS. 1A-1C schematically depict embodiment of a LED filament device 1000, comprising a LED filament unit 1100. FIG. 1A shows on the left the LED filament unit 1100 in a rolled up state (a roll is show), including a control system 300. FIG. 1B on the left shows the LED filament unit 1100 in a stretched state. Electrical contacts 1105,1106 of the LED filament unit 1100 may be functionally coupled to the control system 300.

Hence, in embodiments the LED filament device 1000 may comprise a control system 300 e.g. configured to control the LED filament unit 1100. In embodiments, the control system 300 may be configured to control the LED filament unit 1100. In yet other embodiments, the control system 300 may be configured to control one or more of the LED filaments 400. In yet other embodiments, the control system 300 may be configured to control one or more of the sets 1150 of LED filaments 400. In specific embodiments, the control system 300 may be comprised by the LED filament unit 1100.

Especially, the control system may be configured to control one or more optical properties of the filament unit light 1101. The optical properties may in specific embodiments be selected from the group of intensity, color point, a correlated color temperature.

FIG. 1B schematically depicts a non-limiting number of embodiments of the LED filament device 1000. For instance, they may show a detail of the part indicated with the hatched box in FIG. 1A on the right.

Referring to FIGS. 1A-B, embodiments of the LED filament device 1000 comprising an elongated LED filament unit 1100 are depicted.

Especially, the elongated LED filament unit 1100 may be configured to generate filament unit light 1101.

In embodiments, the elongated LED filament unit 1100 comprises n1 sets 1150 of LED filaments 400. Especially, the n1 sets 1150 of LED filaments 400 are electrically coupled.

As schematically depicted the n1 sets 1150 of LED filaments 400 are configured in a linear array. Especially, $n1 \geq 2$. In embodiments I-III in in FIG. 1B, n1=2 (i.e. 4 LED filaments 400).

Figure 2A:
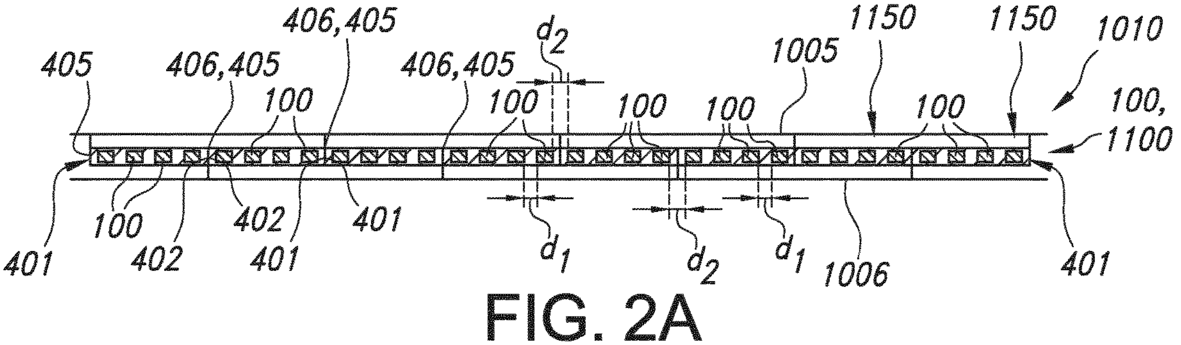
FIGS. 2A-2C schematically depicts some embodiments.
Figure 2B:
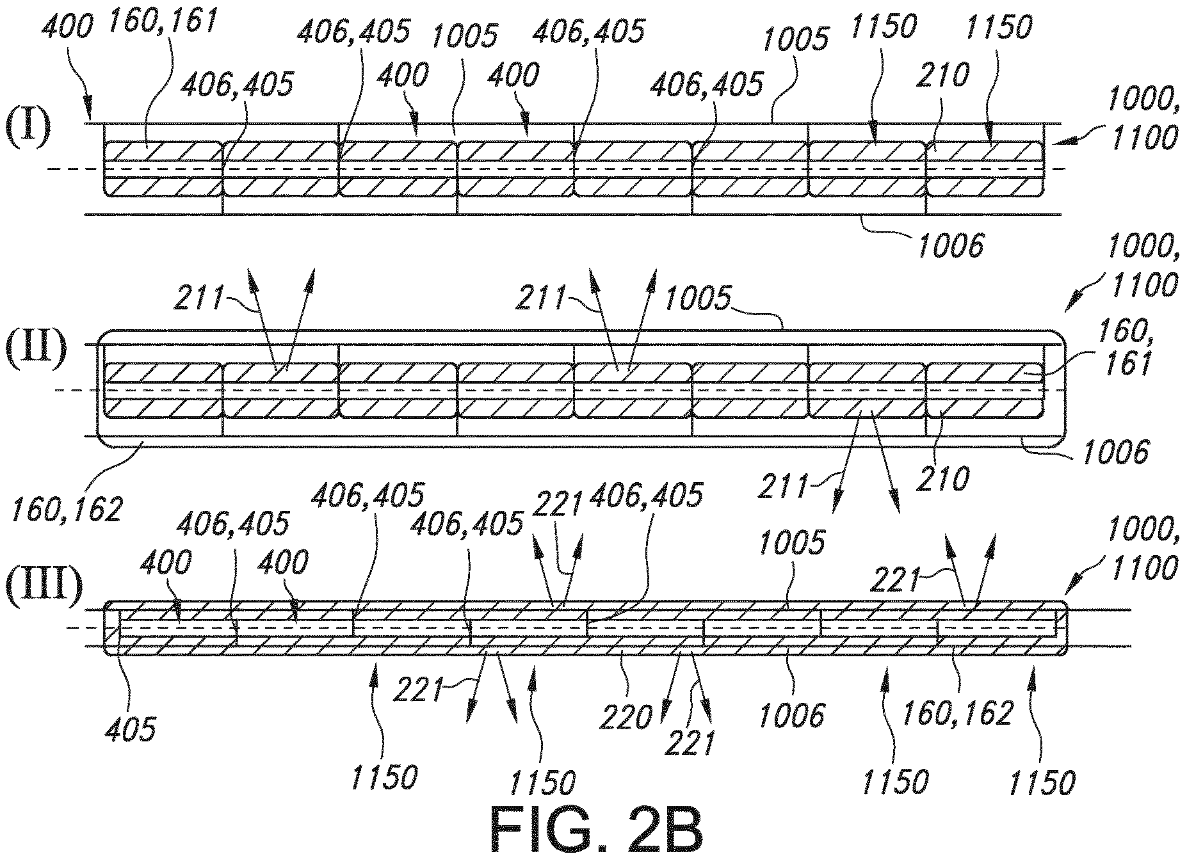

Each set 1150 of LED filaments 400 comprises (at least) two electrically antiparallel configured LED filaments 400 (see further also FIG. 2A-2B).

Especially, the LED filaments 400 are configured to generate filament light 401.

Referring to embodiment IV or FIG. 1B, the LED filament unit 1100 has an LED filament unit length L2, an LED filament unit width W2 and an LED filament unit height H2.

Referring also to FIG. 1C, each LED filament 400 may comprises n2 solid state-based light generating devices 100. Especially, the solid state-based light generating devices 100 are electrically coupled. Instead of the height and width, also the equivalent circular diameter may be used.

The LED filament 400 comprises and electrical contacts 405,406 at (respective) ends 401,402 of the LED filament 400. The LED filament 400 has an LED filament length L1 and a LED filament height H1. Further, the LED filament 400 may have a LED filament width W1 (not depicted, but see also the embodiments of FIG. 3). Instead of the height and width, also the equivalent circular diameter may be used.

Further, the solid state-based light generating devices 100 are configured to generate device light 101. Especially, n2 for the LED filaments 400 are selected from the range of ≥4. In FIG. 1C, n2=6. In FIG. 1B, embodiments I-III n2 for each of the filaments is 3 (by way of example). However, n2 may differ for two or more LED filaments 400.

Especially, one or more of the coupled solid state-based light generating devices 100 are at least partly encapsulated with an encapsulant 160 comprising a light transmissive material. The light transmissive material may e.g. be a resin.

In specific embodiments, not depicted herein, wherein $n1 \geq 4$ and/or $n2 \geq 8$.

Referring to FIG. 1B, adjacent solid state-based light generating devices 100 have shortest distances d1, in specific embodiments selected from the range of 0-4 mm, like in embodiments 0-3 mm, like 0-2 mm, such as 0-1 mm. In embodiments adjacent solid state-based light generating devices 100 on adjacent LED filaments 400 of a set 1150 of LED filaments 400 may have shortest distances d2 selected from the range of 0-8 mm, such as 0-6 mm. Especially, in embodiments adjacent solid state-based light generating devices 100 on adjacent LED filaments 400 of a set 1150 of LED filaments 400 may have shortest distances d2 selected from the range of 0-4 mm, such as especially 0-2 mm. In yet further embodiments, d2 may be selected from the range of 0-1 mm. Hence, all solid state-based light generating devices 100 may in specific embodiments have mutual distances (d1 or d2) selected from the range of 0-4 mm. In specific embodiments, all solid state-based light generating devices 100 may have mutual distances (d1 or d2) selected from the range of 0-2 mm, such as 0-1 mm.

Referring to FIG. 1B, embodiments I and IV, the LED filament device 1000 may comprise a filament support 1010 configured to support the LED filaments 400.

In specific embodiments, the filament support 1010 may be flexible (and/or bendable).

Referring to FIG. 1C, in embodiments one or more of the LED filaments 400 may comprise a light generating device support 410 configured to support the solid state-based light generating devices 100. Further, referring to FIG. 1C, in embodiments one or more of the LED filaments 400 comprise a first encapsulant 161. The first encapsulant 161 may enclose at least part of one or more of the solid state-based light generating devices 100. Hence, in embodiments the encapsulant 160 may comprise the first encapsulant 161.

FIGS. 2A-2B schematically depict some embodiments, with special attention to the antiparallel electric configuration. The dashed squares indicate solid state-based light generating devices 100. FIGS. 2A and 2B schematically depict some embodiments of elongated filament units 1100 (and effectively also of LED filament devices). FIG. 2A and embodiments I-III of FIG. 2B show elongated LED filament unit 1100 comprises n1 sets 1150 of LED filaments 400. Here, by way of example n1=4 and each set comprises two LED filaments 400.

As indicated above, the n1 sets 1150 of LED filaments 400 are electrically coupled. Further, the n1 sets 1150 of LED filaments 400 provide an elongated LED filament unit 1100. As shown, the n1 sets 1150 of LED filaments 400 are configured in a linear array, wherein n1≥2 (here in the embodiments n1=4).

As shown in all embodiments in FIGS. 2A-2B, each set 1150 of LED filaments 400 comprises two electrically antiparallel configured LED filaments 400. However, in specific embodiments more than two LED filaments 400 may be comprised in a in a set 1150.

Further, in embodiments two or more of the n1 sets 1150 of LED filaments 400 are configured electrically antiparallel.

As schematically depicted in the embodiments, the linear array of LED filaments 400 may comprise sets of adjacent LED filaments 400. In specific embodiments, two or more sets of adjacent LED filaments 400 may comprise LED filaments 400 that are configured in physical contact with each other.

As schematically depicted in the embodiments in FIGS. 2A-2B, the LED filament device 1000 may comprise a first elongated electrically conductive track 1005 and a second elongated electrically conductive track 1006. In specific embodiments, each LED filament 400 may be electrically coupled to the first elongated electrically conductive track 1005 and the second elongated electrically conductive track 1006.

Referring to FIG. 2A and e.g. embodiments I of FIG. 2A, in embodiments the first elongated electrically conductive track 1005 and the second elongated electrically conductive track 1006 may be comprised by the filament support 1010.

Referring to FIG. 1C, FIG. 2A, and embodiments I and II of FIG. 2B, in specific embodiments the first encapsulant 161 may comprise a first encapsulant material, wherein the first encapsulant material comprises a first resin and a first luminescent material 210 embedded in the first resin. The first luminescent material 210 may in specific embodiments be configured to convert at least part of the device light 101 into first luminescent material light 211. Hence, in embodiments the light transmissive material comprises the first encapsulant material.

Referring to embodiment III of FIG. 2B, in specific embodiment the elongated LED filament unit 1100 may comprise a second encapsulant 162. Especially, the second encapsulant 1160 encloses at least part of one or more of the LED filaments 400. Hence, the encapsulant 160 may comprise the second encapsulant 162.

In yet further specific embodiments, the second encapsulant 162 may comprise a second encapsulant material. In specific embodiments, the second encapsulant material may comprise a second resin and a second luminescent material 220 embedded in the second resin. Especially, the second luminescent material 220 may be configured to convert at least part of the filament light 401 into second luminescent material light 221. Hence, the light transmissive material may comprise the second encapsulant material. Both the first luminescent material and/or the second luminescent material may be available. In specific embodiments they may also be the same. However, they may also be different.

Figure 2C:
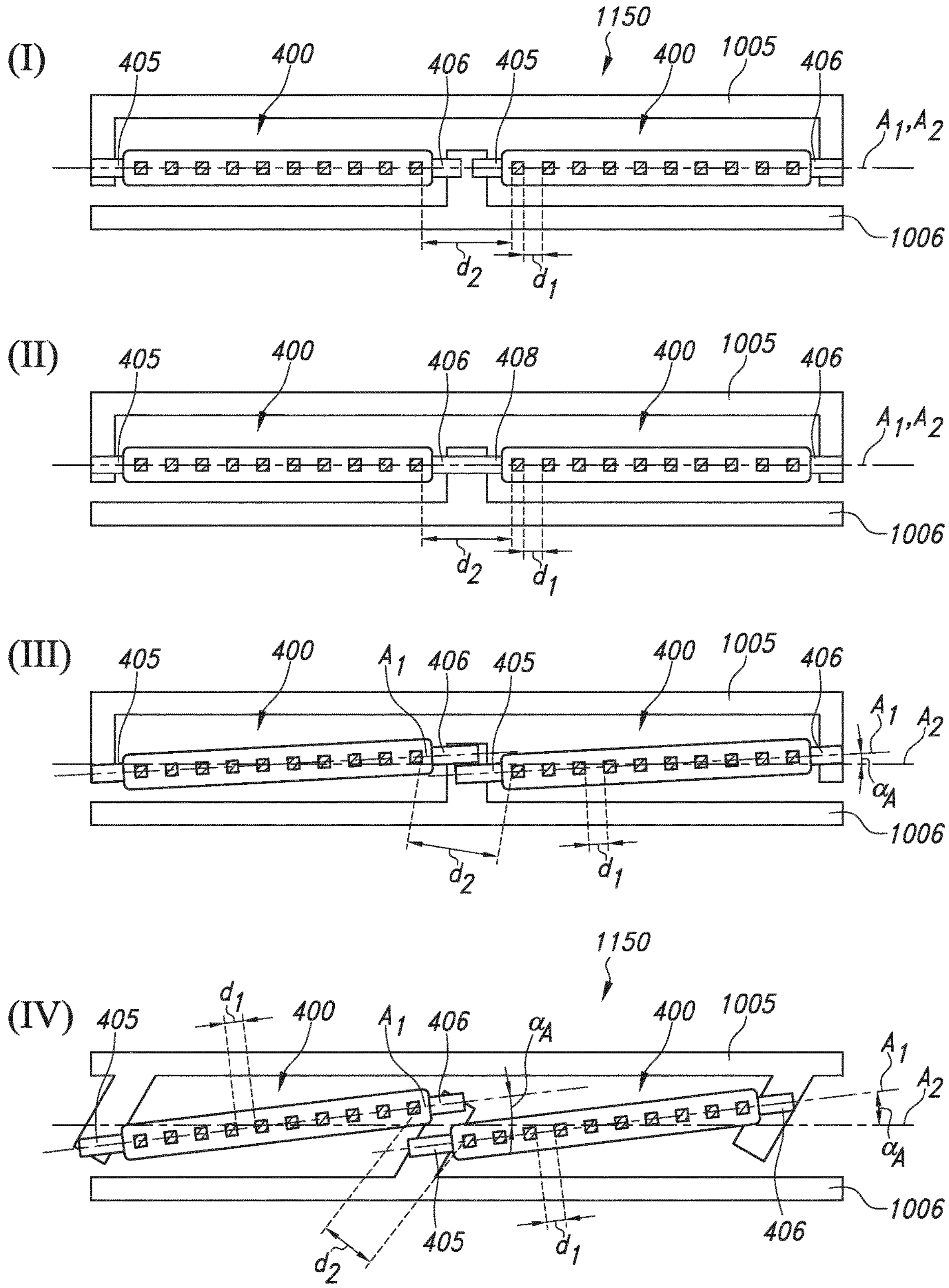

Referring to FIG. 2C, different configurations of a set 1150 of LED filaments 400 may be possible. Here, four embodiments are schematically depicted, thought other embodiments are not excluded. Here, only a single set 1150 of LED filaments 400 is schematically depicted. The LED filament unit 1100, however, may comprise a plurality of the depicted sets 1150.

The LED filaments 400 of a set 1150 of LED filaments 400 may have first length axes A1, wherein the set 1150 of LED filaments 400 has a second length axis A2. Especially, the first length axes may be parallel, see embodiments I-IV. In embodiments, I-II, the first length axes A1 and the second length axis A2 may be parallel and colinear. However, in embodiments III-IV first lengths axis A1 are also parallel, but have a mutual axis angle as with the second length axis A2. In embodiments, mutual axis angle $\alpha_A$ may be selected from the range of 0-30°, such as 2-30°, like 5-30°.

In embodiment I of FIG. 2C, the distance between adjacent electrodes 405,406 may in embodiments be equal to or less than 1 mm. In embodiment II of FIG. 2C, the distance between adjacent electrodes 405,406 may in embodiments be essentially 0 mm. In embodiment III of FIG. 2C, the distance between adjacent electrodes 405,406 may be equal to or smaller than the length of the respective electrodes 405,406. In embodiment IV of FIG. 2C, the distance between adjacent electrodes 405,406 may be essentially 0 mm. Further, in embodiment II, d2 may be smaller than in embodiment I. In embodiment III, the distance d2 can be smaller than in embodiment II. In embodiment IV, the distance d2 can be smaller than in embodiment III.

Figure 3:
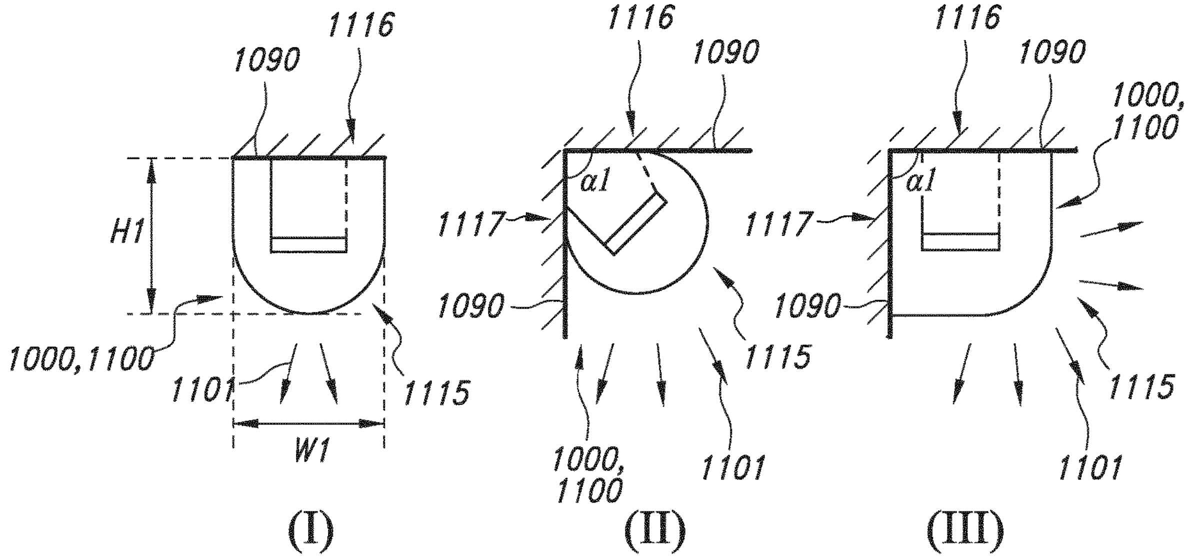
FIG. 3 schematically depicts some further embodiments.

FIG. 3 schematically depicts embodiments wherein the elongated LED filament unit 1100, in a stretched configuration, comprises a first elongated unit side 1115 and a second elongated unit side 1116. During operation, at least part of the filament unit light 1101 propagates away from the first elongated unit side 1115. Further, the LED filament device 1000 further comprises adhesive material 1090 associated to the second elongated unit side 1116. In a rolled state, the adhesive material protector may prevent sticking together of the roll.

Referring to embodiments II and III of FIG. 3, the LED filament device 1000 may further comprise a third elongated unit side 1117. In specific embodiments, adhesive material 1090 may (also) be associated to the third elongated unit side 1117. The second elongated unit side 1116 and the third elongated unit side 1117 have a first mutual angle $\alpha 1$. In the embodiments schematically depicted, the first mutual angle $\alpha 1$ is 90°. However, other mutual angles may also be possible.

Figure 4:
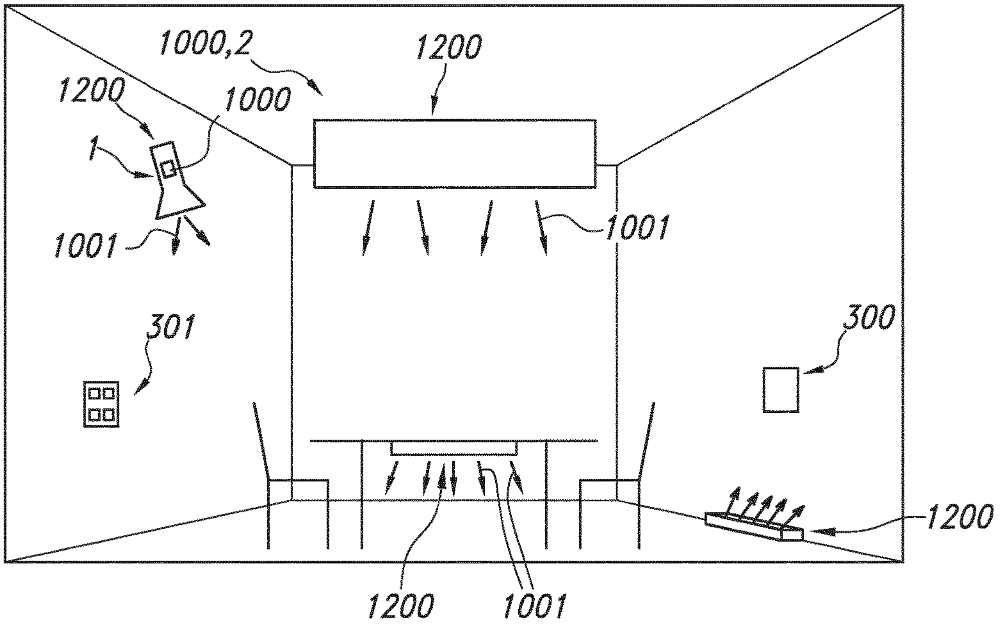
FIG. 4 schematically depicts some further (application) embodiments. The schematic drawings are not necessarily to scale.

FIG. 4 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 5 also schematically depicts an embodiment of lamp 1 comprising the light generating system 1000. Reference 3 indicates a projector device or projector system, which may be used to project images, such as at a wall, which may also comprise the light generating system 1000. Hence, FIG. 4 shows amongst others one or more of a light generating device 1200 selected from the group of a lamp 1, a luminaire 2, a disinfection device, and an optical wireless communication device, comprising the light generating system 1000. FIG. 4 also schematically depicts an embodiment of the lighting device 1200 comprising a wall light device (such as especially wall washers).

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A LED filament device comprising an elongated LED filament unit, wherein the elongated LED filament unit is configured to generate filament unit light; wherein:

the elongated LED filament unit comprises n1 sets of LED filaments, wherein the n1 sets of LED filaments, wherein the n1 sets of LED filaments are configured with one contact from one of the n1 sets of LED filaments is electrically coupled to another contact from another of the n1 sets to form a continuous linear array of end-to-end LED filaments, wherein $n1 \geq 2$; wherein each set of LED filaments comprises at least two electrically antiparallel configured LED filaments;

the LED filaments are configured to generate filament light; wherein each LED filament comprises n2 solid state-based light generating devices, wherein the solid state-based light generating devices are electrically coupled, wherein the solid state-based light generating devices are configured to generate device light; wherein n2 for the LED filaments are selected from the range of $\geq 4$;

one or more of the coupled solid state-based light generating devices are at least partly encapsulated with an encapsulant comprising a light transmissive material; and two or more of the n1 sets of LED filaments are configured electrically antiparallel.

2. The LED filament device according to claim 1, wherein n1≥4, wherein 16≤n2≤80; wherein adjacent solid state-based light generating devices have shortest distances selected from the range of 0-2 mm; and wherein adjacent solid state-based light generating devices on adjacent LED filaments of a set of LED filaments have shortest distances selected from the range of 0-6 mm.

3. The LED filament device according to claim 1, wherein all sets of the n1 sets of LED filaments are configured electrically antiparallel.

4. The LED filament device according to claim 1, wherein the linear array of LED filaments comprises sets of adjacent LED filaments, wherein two or more sets of adjacent LED filaments comprise LED filaments that are configured in physical contact with each other.

5. The LED filament device according to claim 1, comprising a first elongated electrically conductive track and a second elongated electrically conductive track, wherein each LED filament is electrically coupled to the first elongated electrically conductive track and the second elongated electrically conductive track.

6. The LED filament device according to claim 5, wherein the first elongated electrically conductive track and the second elongated electrically conductive track are comprised by the filament support.

7. The LED filament device according to claim 1, comprising a filament support configured to support the LED filaments; wherein the filament support is one or more of flexible and bendable.

8. The LED filament device according to claim 1, wherein one or more of the LED filaments comprise a light generating device support configured to support the solid state-based light generating devices.

9. The LED filament device, according to claim 1, wherein one or more of the LED filaments comprise a first encapsulant, wherein the first encapsulant encloses at least part of one or more of the solid state-based light generating devices.

10. The LED filament device according to claim 9, wherein the first encapsulant comprises a first encapsulant material, wherein the first encapsulant material comprises a first resin and a first luminescent material embedded in the first resin, wherein the first luminescent material is configured to convert at least part of the device light into first luminescent material light.

11. The LED filament device, according to claim 1, wherein the elongated LED filament unit comprises a second encapsulant, wherein the second encapsulant encloses at least part of one or more of the LED filaments; wherein the second encapsulant comprises a second encapsulant material, wherein the second encapsulant material comprises a second resin and a second luminescent material embedded in the second resin, wherein the second luminescent material is configured to convert at least part of the filament light into second luminescent material light.

12. The LED filament device, according to claim 1, wherein the LED filaments of a set of LED filaments have first length axes, wherein the set of LED filaments has a second length axis (A2) wherein the first length axis are parallel and have a mutual axis angle αA with the second length axis (A2); wherein the mutual axis angle αA is selected from the range of 2-30°; and wherein the LED filament device comprises a control system configured to control the LED filament unit.

13. The LED filament device according to claim 1, wherein the elongated LED filament unit in a stretched configuration comprises a first elongated unit side and a second elongated unit side, wherein during operation at least part of the filament unit light propagates away from the first elongated unit side, wherein the LED filament device further comprises adhesive material associated to the second elongated unit side.

14. The LED filament device according to claim 13, further comprising a third elongated unit side, wherein adhesive material is associated to the third elongated unit side, wherein the second elongated unit side and the third elongated unit side have a first mutual angle (α1, wherein the first mutual angle (α1) is 90°.

15. A light generating device selected from the group of a lamp, a luminaire, a disinfection device, and an optical wireless communication device, comprising the LED filament device according to claim 1.

16. The LED filament device according to claim 1, wherein the n1 sets of LED filaments are configured in a continuous linear array, wherein n1≥4.

* * * * *